United States Patent [19]

Neri

[11] 4,110,752
[45] Aug. 29, 1978

[54] SYSTEMS FOR REDUCING THE ELEVATION ERROR FOR TRACKING RADARS OF LOW HEIGHT TARGETS

[75] Inventor: Filippo Neri, Rome, Italy

[73] Assignee: Selenia-Industrie Elettroniche Associate S.p.A., Italy

[21] Appl. No.: 784,871

[22] Filed: Apr. 5, 1977

[30] Foreign Application Priority Data

Feb. 16, 1976 [IT] Italy ............................. 51311 A/76

[51] Int. Cl.² ........................................... G01S 9/02
[52] U.S. Cl. ................................................. 343/7.4
[58] Field of Search ..................................... 343/7.4

[56] References Cited

U.S. PATENT DOCUMENTS 3,827,049 7/1974 Van Staaden et al. ........... 343/7.4 X
3,940,766 2/1976 Cross et al. ........................ 343/7.4
4,005,421 1/1977 Dax .................................... 343/7.4 X Primary Examiner—T.H. Tubbesing
Attorney, Agent, or Firm—Beveridge, De Grandi, Kline & Lunsford

[57] ABSTRACT

A system for the automatic correction of the nodding elevation errors for radars tracking targets at low height, comprising in a conventional mode a receiving and transmitting group associated with an intermediate frequency channel and with an antenna servo in azimuth and elevation, having a channel of azimuth error and a channel of elevation error, comprising means for detecting the variations of the amplitude of the echo signal due to the multiple reflection effected at low height and means for subtracting the signal formed by said variations from the channel of elevation error of the antenna servo.

12 Claims, 4 Drawing Figures

SYSTEMS FOR REDUCING THE ELEVATION ERROR FOR TRACKING RADARS OF LOW HEIGHT TARGETS

The present invention relates to a system for automatically reducing or compensating the elevation error for radars tracking low height targets.

More particularly the present invention relates to a system for automatically compensating the elevation error of frequency-agile radars for tracking targets movable at low height on radio wave reflecting surfaces, such as the sea surface.

In the radar tracking of low elevation targets it is possible to have the target and of its electric image in the presence of the antenna beam simultaneously.

This can cause the phenomenon commonly called "nodding" which introduces a noticeable error in the radar measurement of the elevation of the targets.

Various systems are known to remove, or at least to attenuate, this drawback.

Some of these known systems are:

(a) "OFF BORESIGHT": the tracking is made with the antenna aimed high in order to reduce the effect of the reflected ray;

(b) Radar in different bands: two separate radars are used, operating on different frequencies, for instance X band and Ku band;

(c) Processing of components in quadrature: in this way, by measuring the sine and cosine components of the error angle, the correct position of the target will be found;

(d) Addition of a third antenna beam: the existence of this solution is known, but no precise information on the results is available.

The system according to the present invention for the automatic correction of the nodding error has been developed based on the following observations:

(i) in case of non flickering targets (perfect reflector) there is a relationship between the amplitude of the echo signal of the tracked target (measured, for instance, by means of AGC voltage of the radar receiver) and the nodding error;

(ii) the relationship according to (i) always has the same ratio, for various reflecting coefficients of the sea surface;

(iii) said relationship also exists with the nodding residual error appearing when the radar operates with frequency agility (the frequency agility tends to reduce or to annul the nodding error). In this case the relationship co-efficient is still greater.

(iv) frequency agility allows intrinsically flickering targets to be considered practically non flickering.

The present invention will be now described in one preferred embodiment which is disclosed only by way of non limitative example with reference to the attached drawings wherein.

As previously said, frequency agility allows all targets to be considered non flickering, both the complex type targets (aircraft, helicopters) and the simpler types (missiles). The value of the suitably filtered useful signal thus supplies, apart from its monotone type variation notoriously associated with the target range, a measure of the equivalent area of the target.

Furthermore, for non flickering targets, the effect of the multiple path of the incident and reflected beams (see later on, with reference to FIG. 1) is such as to modify the apparent equivalent area of the target. In fact the apparent area increases when the direct and reflected signals combine in phase, while when they combine out of phase attenuation peaks of the effective echo signal taken by the antenna result.

Figure 1:
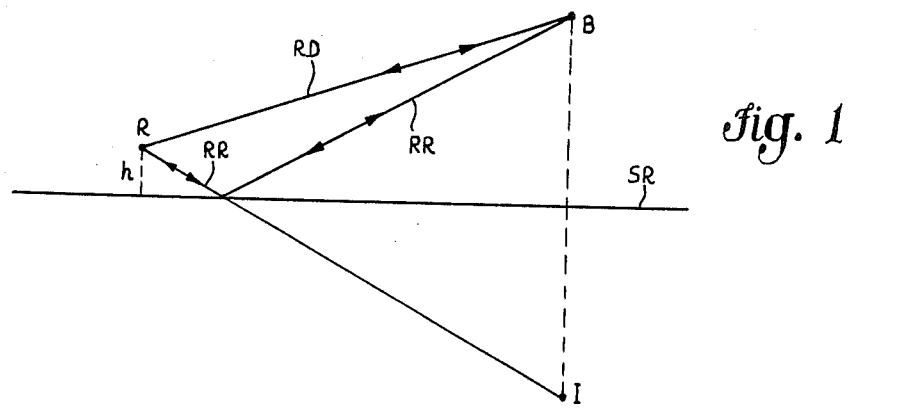
FIG. 1 shows diagrammatically the reflection geometry for a low height target on a reflecting surface (sea surface)

Let us consider FIG. 1. The radar antenna located at point R at a height $h$ above the reflecting surface SR illuminates the target B according to the direct path RD and the indirect path RR. The energy reflected by the target B will also be seen by the radar antenna located at R, not only through the direct path RD, also through the indirect path RR but reflecting on the surface SR. The apparent image point I is symmetrical to B with respect to the reflecting surface SR, if SR is, for instance, a non-excessively rough sea surface.

Figure 2:
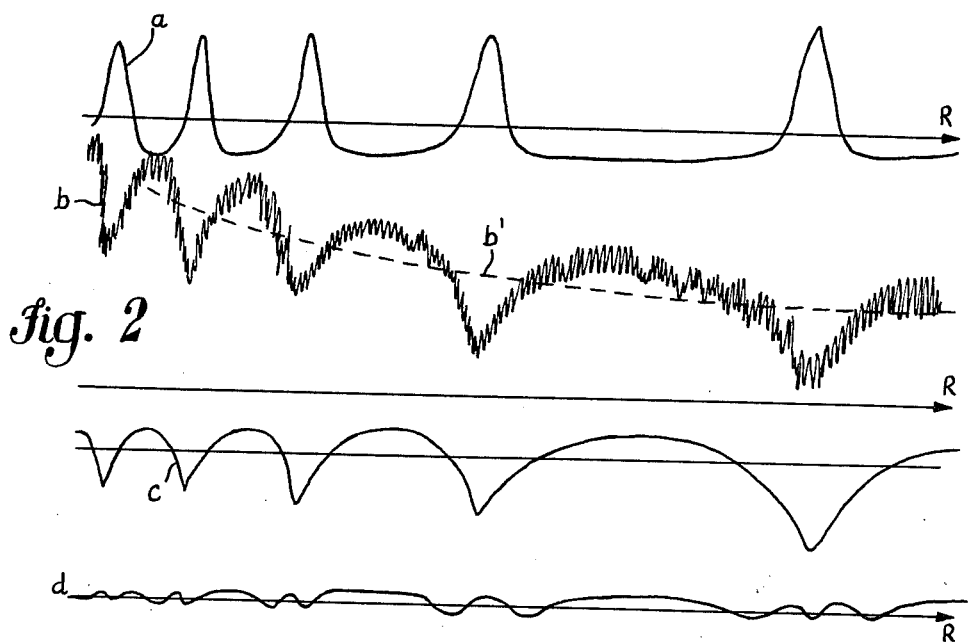
FIG. 2 depicts the nodding error, signals associated therewith, and the residual nodding error obtained by the system according to the present invention.

This causes the nodding effect, namely an elevation error in the form of pointing at an approaching target, which for the case of constant height is shown in FIG. 2. When the direct and reflected signals are not close to counterphase the error is negative and the antenna is in stable equilibrium between the target B and the image I (bias); if, on the other hand the signals are close to counterphase the error is positive and the antenna will quickly be carried above the target-image system (nodding peaks).

Let us consider now FIG. 2.

The graph (a) depicts the nodding error. The graph (b) depicts the amplitude of the signal received by the radar receiver. It will be immediately noted that, apart from the slashed line of the graph (b) due to the frequency agility and apart from the slowly variable component (b') shown in dotted line, an evident relationship exists between the nodding error and the amplitude of the envelope of the received signal. It is noted that when the nodding error is at a peak, there is an attenuation of the received signal. When, on the contrary, in the curve (a) an "offset" appears, the amplitude of the received signal, curve (b) is on the average greater than that which would occur in the absence of spurious reflections, curve (b').

If the signal represented by the curve (b) is submitted to a filtering action to remove the relatively high frequency component (the slashed part due to the frequency agility) and to remove the component which changes slowly with the range of the target, a "clean" signal will be obtained, as shown by the curve (c). By subtracting the signal of curve (c) from the signal of curve (a) which is proper with the correction supplied by a certain constant, an angular error signal (d) will be obtained for controlling the tracking servo wherein the nodding errors are lowered down to the level of the noise that is normally present in the channels of angular "error" of elevation circuitry.

Figure 3:
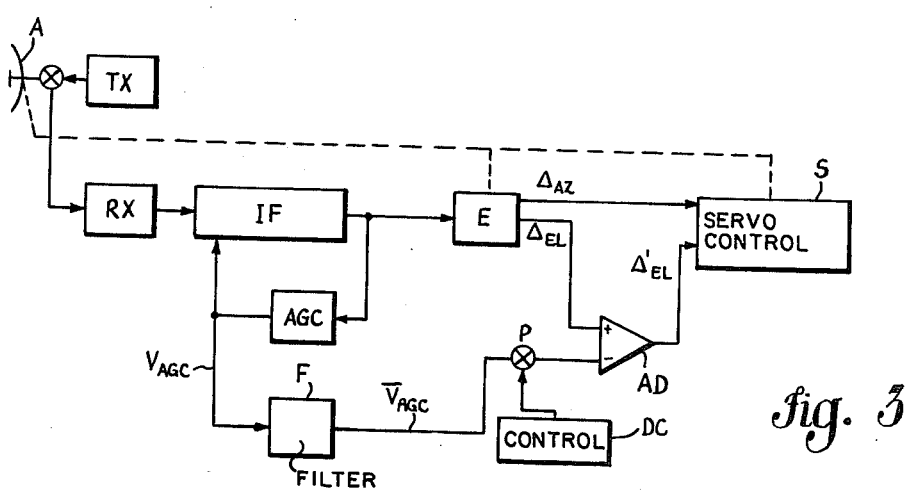
FIG. 3 shows a simplified block diagram of the correcting system according to this invention.

With reference to FIG. 3, a possible embodiment will be now described of a circuit for correcting the nodding error.

The antenna A of the tracking radar is fed in a known way by a transmitter TX, suitably a frequency-agile transmitter. The antenna A feeds in an also known way a receiver RX which, in turn, applies the signal to an intermediate frequency channel IF. The intermediate frequency channel IF is also provided in a known way with an automatic gain control signal AGC from feedback amplifier AGC. The voltage $V_{AGC}$ represents for practical purposes the intensity of the received signal (it is clear that the intermediate frequency signal will be taken from a point of the channel IF where no possible, non linear, operations still intervene, such as limitation or compression of the signal).

The voltage $V_{AGC}$ is filtered by the filter F according to the modes as previously described, namely suppression of the slowly variable component and of the component having a relatively high frequency, so as to obtain a $\overline{V}_{AGC}$ corresponding to the signal (c) of FIG. 2.

In the circuit E are generated signals corresponding to the elevation and azimuth errors, denoted by $\Delta_{EL}$ and $\Delta_{AZ}$, respectively. The $\Delta_{AZ}$ signal is applied directly to the antenna servo system S. The signal $\Delta_{EL}$ is applied to the differential amplifier AD which behaves as a simple repeater of the signal $\Delta_{EL}$ if the gate P is disabled by the decision circuit DC and as a subtractor for supplying a signal $\Delta'_{EL}$ if the gate P is enabled. The signal $\Delta'_{EL}$ is represented by the wave shape (d) of FIG. 2.

The voltage $\Delta'_{EL}$ contains a residum of irregularity which is not higher than the "noise" normally present in the elevation servo signals.

Figure 4:
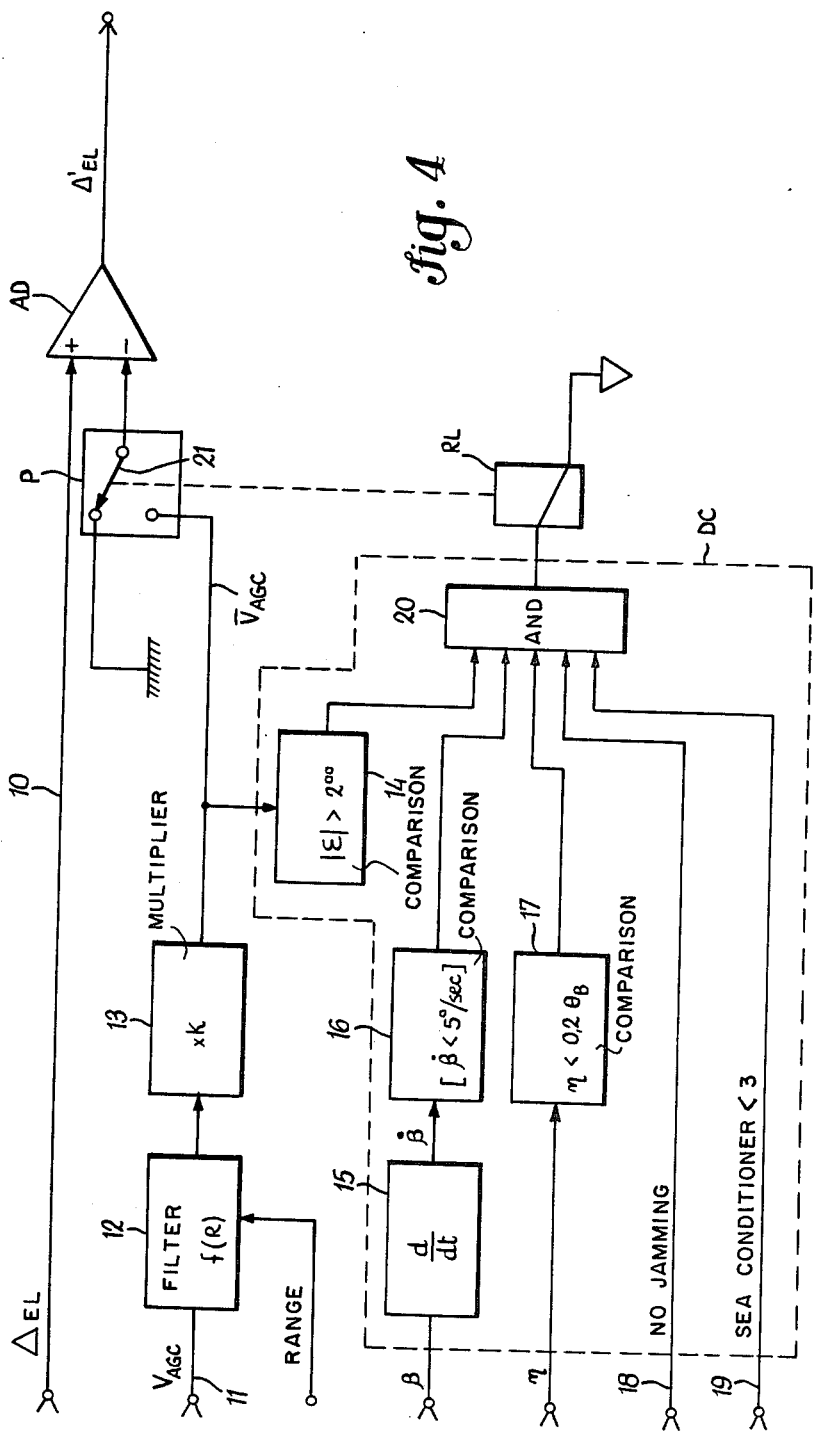
FIG. 4 shows a detailed block diagram of the correcting system according to this invention.

The decision circuit DC can be a simple control activated by an operator enabling the gate P. Alternatively the decision circuit DC can be implemented as shown in the diagram of FIG. 4.

With reference to this figure, the elevation error signal $\Delta_{EL}$ is present on line 10. Terminal 11 receives the voltage $V_{AGC}$ carrying the information relative to the amplitude of the echo signal. The voltage $V_{AGC}$ is filtered in filter 12 according to the modes as previously described and taking into account the target range. The output from the filter 12 is amplified or attenuated according to a multiplying constant "K" in circuit 13 in order to provide the correction signal $\overline{V}_{AGC}$ which is applied to one input of gate P.

Several signals are applied to the decision circuit DC. More precisely, the correction voltage $\overline{V}_{AGC}$ is applied to the threshold circuit 14 which determines whether the nodding error $\epsilon$ is greater in absolute value than 2 mils. The information relative to the azimuth angle $\beta$ is differentiated with respect to time in differentiator 15. The value $d\beta/dt$ is applied to the threshold circuit 16 where it will be ascertained whether the target is maneuvering beyond a certain limit, for instance whether $(d\beta/dt) < 5°/sec$. In other words, if the target maneuvres beyond a certain limit, the antinodding device will be excluded since the target must have a reasonably stationary attitude before correction is appropriate. In order for the target to represent a threat, said target must follow a reasonably steady path, in which case the azimuth angle $\beta$ will not change a remarkable amount.

The information relative to the elevation angle $\eta$ is applied to the threshold circuit 17 in order to ascertain whether $\eta < 0.2 \theta_B$ ($\theta_B$ being the aperture of the antenna beam measured at $-3dB$). In other words, the anti-nodding device will not be utilized when the target is sufficiently high.

The decision circuit also receives signal 18 showing the absence of jamming. If there is jamming, the antinodding device will not be utilized because jamming errors will be certainly greater than the nodding error which is to be removed. The decision circuit also receives signal 19 which indicates that the conditions of the sea are less than "force 3." If the sea condition is worse than "force 3" the surface is not reflecting enough to cause an appreciable nodding error for frequency-agile radars.

The outputs from the threshold circuits 14, 16, and 17 and the signals 18, and 19 are applied to the AND circuit 20 which effects the logic operation of coincidence in order to control the opening of the gate P, diagrammatically shown as a contact 21 controlled by a relay RL.

The present invention has been described with reference to one embodiment thereof at present preferred, but it will be understood that changes and modifications might be made therein without departing from the scope of the present industrial privilege.

Having thus described the present invention, what is claimed is:

1. In a system for the automatic correction of nodding elevation errors of radars tracking targets at low heights, including an antenna, a radar transmitter coupled to the antenna for transmitting radar signals therefrom, a radar receiver coupled to the antenna for receiving radar signals therefrom, intermediate frequency channel circuitry, azimuth error detection circuitry for generating an azimuth error signal, elevation error detection circuitry for generating an elevation error signal, an antenna servo, and coupling means for coupling the antenna servo to the azimuth error detection circuitry, to the elevation error detection circuitry and to the antenna for controlling positioning of the antenna in accordance with the azimuth error signal and the elevation error signal, the improvement in which the coupling means includes elevation error correction circuitry comprising first circuit means for detecting variations of the amplitude of the received radar signals due to the reflection effect at low height and for generating a variation signal indicative thereof, second circuit means for subtracting the variation signal from the elevation error signal to provide a corrected elevation error signal, and third circuit means for applying the corrected elevation error signal to the antenna servo to control the antenna elevation in accordance therewith.

2. In a system as claimed in claim 1 the further improvement in which said first circuit means comprises an automatic gain control feedback amplifier having an input coupled to an output of the intermediate frequency channel circuitry and having an output coupled to an input of the intermediate frequency channel circuitry; and band passed filter means connected to said feedback amplifier output, to receive an automatic gain controlled signal therefrom, for removing from the automatic gain controlled signal slowly variable signal components due to variation of range of tracked targets and quickly variable signal components due to flicker of the apparent area of the target when the frequency changes.

3. In a system as claimed in claim 2, the further improvement in which said first circuit means includes control means for selectively inhibiting subtraction of the variation signal from the elevation error signal, to cause said third circuit means to apply the uncorrected elevation error signal to the antenna servo to control the antenna elevation in accordance therewith.

4. In a system as claimed in claim 3, the further improvement in which said control means is manual control means.

5. In a system as claimed in claim 3, the further improvement in which said control means is automatic control means.

6. In a system as claimed in claim 3, the further improvement in which the radar transmitter and the radar receiver are of the frequency-agile type.

7. In a system as claimed in claim 2, the further improvement in which the radar transmitter and the radar receiver are of the frequency-agile type.

8. In a system as claimed in claim 1, the further improvement in which said first circuit means includes control means for selectively inhibiting subtraction of the variation signal from the elevation error signal, to cause said third circuit means to apply the uncorrected elevation error signal to the antenna servo to control the antenna elevation in accordance therewith.

9. In a system as claimed in claim 8, the further improvement in which said control means is manual control means.

10. In a system as claimed in claim 8, the further improvement in which said control means is automatic control means.

11. In a system as claimed in claim 8, the further improvement in which the radar transmitter and the radar receiver are of the frequency-agile type.

12. In a system as claimed in claim 1, the further improvement in which the radar transmitter and the radar receiver are of the frequency-agile type.

* * * * *

UNITED STATES PATENT OFFICE
CERTIFICATE OF CORRECTION

PATENT NO. : 4,110,752
DATED : August 29, 1978
INVENTOR(S) : FILIPPO NERI

It is certified that error appears in the above–identified patent and that said Letters Patent are hereby corrected as shown below:

Change the Foreign Application Priority Data from

"February 16, 1976 [IT]" to --September 16, 1976 [IT]--

Signed and Sealed this

Tenth Day of April 1979

[SEAL]

Attest:

RUTH C. MASON
Attesting Officer

DONALD W. BANNER
Commissioner of Patents and Trademarks